United States Patent
Felkey et al.

(10) Patent No.: US 8,364,798 B2
(45) Date of Patent: Jan. 29, 2013

(54) METHOD AND SYSTEM FOR PROVIDING SOFTWARE INTEGRATION FOR A TELECOMMUNICATIONS SERVICES ON-LINE PROCUREMENT SYSTEM

(75) Inventors: Mark A. Felkey, Colorado Springs, CO (US); Tyler J. West, Atlanta, GA (US); Susan O. Diemer, Reston, VA (US); Michael E. Marcellin, Ashburn, VA (US); Diane L. Sabatini, McLean, VA (US); Elaine S. Mason, Stone Mountain, GA (US); David K. Braverman, Alpharetta, GA (US); Patricia A. Boyer, Fairfax Station, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1721 days.

(21) Appl. No.: 10/051,180

(22) Filed: Jan. 22, 2002

(65) Prior Publication Data

US 2004/0015824 A1   Jan. 22, 2004

Related U.S. Application Data

(60) Provisional application No. 60/263,222, filed on Jan. 23, 2001.

(51) Int. Cl.
*G06F 15/173* (2006.01)
(52) U.S. Cl. ............... 709/223; 379/201.01; 379/121.01
(58) Field of Classification Search ............... 705/26, 705/1, 34, 7.14; 717/104; 379/201.01, 121.01, 379/207.02; 370/259; 709/223, 203, 219; 700/101
See application file for complete search history.

(56) References Cited

U.S. PATENT DOCUMENTS

| | | | | |
|---|---|---|---|---|
| 5,696,906 A * | 12/1997 | Peters et al. | | 705/34 |
| 5,758,329 A | 5/1998 | Wojcik et al. | | |
| 5,812,533 A * | 9/1998 | Cox et al. | | 370/259 |
| 5,875,437 A | 2/1999 | Atkins | | |
| 5,920,846 A * | 7/1999 | Storch et al. | | 705/7.14 |
| 6,014,651 A * | 1/2000 | Crawford | | 705/400 |
| 6,055,516 A | 4/2000 | Johnson et al. | | |
| 6,349,238 B1 * | 2/2002 | Gabbita et al. | | 700/101 |
| 6,381,321 B1 * | 4/2002 | Brown et al. | | 379/207.02 |
| 6,427,140 B1 * | 7/2002 | Ginter et al. | | 705/80 |
| 6,535,593 B1 * | 3/2003 | Cashiola | | 379/121.01 |
| 6,625,581 B1 * | 9/2003 | Perkowski | | 705/26 |
| 6,633,907 B1 * | 10/2003 | Spencer et al. | | 709/223 |
| 6,671,818 B1 * | 12/2003 | Mikurak | | 714/4 |
| 6,721,713 B1 * | 4/2004 | Guheen et al. | | 709/223 |
| 6,839,745 B1 * | 1/2005 | Dingari et al. | | 709/219 |
| 6,856,676 B1 * | 2/2005 | Pirot et al. | | 379/201.01 |
| 2001/0032092 A1 * | 10/2001 | Calver | | 705/1 |
| 2002/0116287 A1 * | 8/2002 | Schubert et al. | | 705/26 |
| 2003/0074463 A1 * | 4/2003 | Swartz et al. | | 709/230 |

OTHER PUBLICATIONS

U.S. Appl. No. 10/051,282, Jan. 2002, Felkey et al.
U.S. Appl. No. 10/051,182, Jan. 2002, Felkey et al.

* cited by examiner

*Primary Examiner* — Dustin Nguyen

(57) ABSTRACT

A system method for providing software integration for telecommunications offerings online procurement, including a first layer configured to receive at least one of a request and a user action from a web server; and a second layer coupled to the first layer and configured to perform at least one of order management, online ordering and user management functions. At least one of the first layer and the second layer includes software objects extended to support procurement of the telecommunications offerings on-line and custom software objects created to support procuring of the telecommunications offerings on-line.

37 Claims, 10 Drawing Sheets

METHOD AND SYSTEM FOR PROVIDING SOFTWARE INTEGRATION FOR A TELECOMMUNICATIONS SERVICES ON-LINE PROCUREMENT SYSTEM

CROSS REFERENCE TO RELATED CASES

The present invention claims the benefit of priority under 35 U.S.C. §119(e) to U.S. Provisional Patent Application No. 60/263,222 of Diemer et al., entitled "On-Line Servicing System" filed on Jan. 23, 2001.

BACKGROUND OF THE INVENTION

1. Field of the Invention

The present invention relates to an information processing system and more particularly to a method and system for providing software integration for telecommunications offerings (e.g., telecommunications products and/or services) on-line procurement.

2. Discussion of the Background

From the perspective of the customers of telecommunication services, the interaction between them and the customer representatives have been inefficient and frustrating. Because of the emergence of the many, and often perplexing, telecommunication services, the experience that the customers undergo when procuring services is far from user friendly. Further, customers do not enjoy dialing into a call center to wait in queue for a customer representative to tend to them, with no guarantees that the customer representative can adequately service their needs.

Service providers, therefore, have sought to provide a self-service on-line system through the use of the World Wide Web (WWW). However, ineffective user interfaces and nonintegrated systems have introduced the same, if not greater, level of frustration than interacting with a live human. In particular, in light of the sophistication of modern telecommunication services, a live person may be required to intercede in the procurement process.

Based on the foregoing, there is a clear need for improved approaches for servicing customers via an on-line system to procure telecommunications services. There is also a need to enhance the efficiency of provisioning telecommunications services for the customers. There is a further need to cater to customers of varying level of sophistication, such that customers who require greater assistance are given the necessary attention.

Based on the need to enhance the customer experience in procuring telecommunication services, an approach for implementing an on-line system that provides a user-friendly and efficient mechanism to acquire services from a service provider is highly desirable.

SUMMARY OF THE INVENTION

The present invention addresses the above stated and other needs by providing an on-line system that offers an effective mechanism to efficiently procure telecommunication services. The system provides a new customer experience for pre-sale, order processing, and post-sale support. For pre-sale services, a prospective customer links to the site of, for example, a proprietary telecommunications service provider (or directly at a site promoting itself) and are presented with product materials and tools. Once the prospective customer has determined the services appropriate to his/her business and the system has qualified them, they may enter a Shopping Cart/Service Ordering section of the site, select their services and click on, for example, an "Order Now" button to proceed. Afterwards, a new customer may then enter either the site (or other on-line applications, such as Interact, etc.) to check order status, manage existing services, place additional orders, pay on-line, etc.

According to one aspect of the present invention there is provided a system for providing software integration for telecommunications offerings on-line procurement, including a first layer configured to receive at least one of a request and a user action from a web server; and a second layer coupled to the first layer and configured to perform at least one of order management, online ordering and user management functions. At least one of the first layer and the second layer includes software objects extended to support procurement of the telecommunications offerings on-line and custom software objects created to support procuring of the telecommunications offerings on-line.

According to another aspect of the present invention there is provided a method for providing software integration for telecommunications offerings on-line procurement, including receiving at least one of a request and a user action from a web server in a first layer; performing at least one of order management, online ordering and user management functions in a second layer; extending software objects in at least one of the first and second layers to support procuring of the telecommunications offerings on-line; and creating custom software objects in at least one of the first and second layers to support the procurement of the telecommunications offerings on-line.

According to another aspect of the present invention there is provided a system for providing software integration for telecommunications offerings on-line procurement, including means for receiving at least one of a request and a user action from a web server in a first layer; means for performing at least one of order management, online ordering and user management functions in a second layer; means for extending software objects in at least one of the first and second layers to support procuring of the telecommunications offerings on-line; and means for creating custom software objects in at least one of the first and second layers to support the procurement of the telecommunications offerings on-line.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The following commonly owned co-pending U.S. patent application Ser. No. 10/051,182, filed Jan. 22, 2002, entitled "Graphical User Interface For Procuring Telecommunications Services On-Line," and U.S. patent application Ser. No. 10/051,282, filed Jan. 22, 2002, entitled "Method And System For Procuring Telecommunications Services On-Line,", are incorporated herein by reference.

A method and system for providing software integration for a telecommunications services on-line procurement system are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
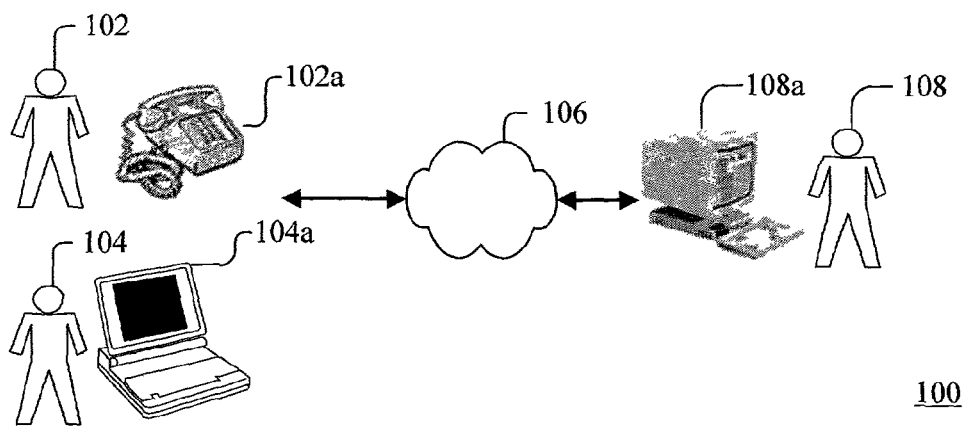
FIG. 1 is a top-level block diagram illustrating a system for procuring telecommunications products and/or services based.

The present invention includes recognition of problems associated with tradition systems and methods for procuring telecommunications products and/or services. In FIG. 1, a system 100 for procuring telecommunications products and/or services is shown and includes one or more customers 102 and 104 and customer devices 102a and 104a (i.e., a telephone and personal computer) coupled to a communications network 106 (i.e., a Public Switched Telephone Network (PSTN) or the Internet). Numerous personnel 108, such as core customer representatives, implementation engineers, implementation coordinators, order distributors, etc., via devices 108a, can connect to the communications network 106 and are employed for procuring telecommunications products and/or services for the customers 102 or 104 under such flow.

Figure 2:
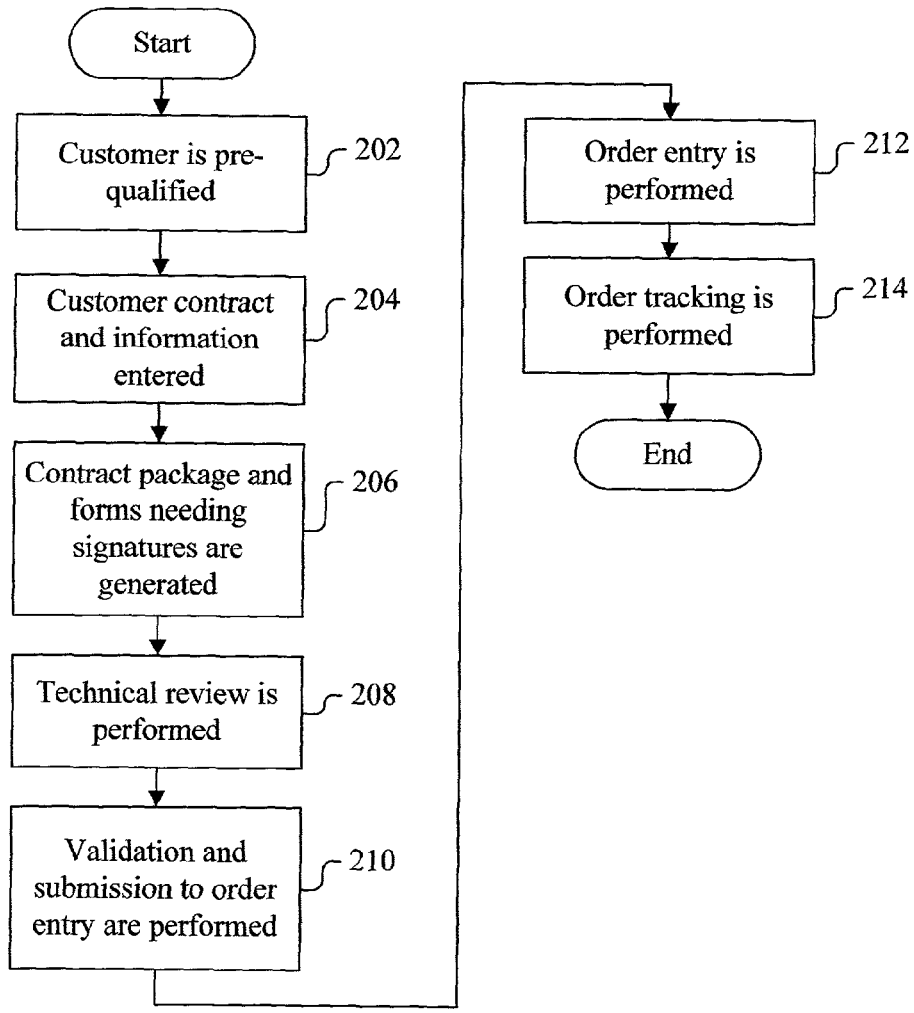
FIG. 2 is a flowchart illustrating a flow for procuring telecommunications products and/or services.

FIG. 2 is a flowchart illustrating a flow for procuring telecommunications products and/or services in the system 100. In FIG. 2, at step 202, the customer 102 or 104 is pre-qualified by a core customer representative 108 for telecommunications products and/or services desired by the customer 102 or 104. At step 204, customer contract and information are entered by the core customer representative 108. At step 206, a contract package and forms needing signatures are generated by the core customer representative 108. At step 208, an implementation engineer 208 performs a technical review of the telecommunications products and/or services desired by the customer 102 or 104. At step 210, validation and submission to order entry for the telecommunications products and/or services desired by the customer 102 or 104 are performed by an implementation coordinator 108. At step 212, order entry for the telecommunications products and/or services desired by the customer 102 or 104 is performed by the implementation coordinator, the implementation engineer and/or the order distributor 108. At step 214, order tracking is performed by the implementation coordinator 108, completing the flow for procuring telecommunications products and/or services.

Accordingly, such flow involves numerous personnel 108 and time-consuming processing steps 202-214 in order to procure telecommunications products and/or services for the customer 102 or 104. The present invention addresses the problems with such flow for procuring telecommunications products and/or services and is further described with reference to FIGS. 3-6.

Figure 3:
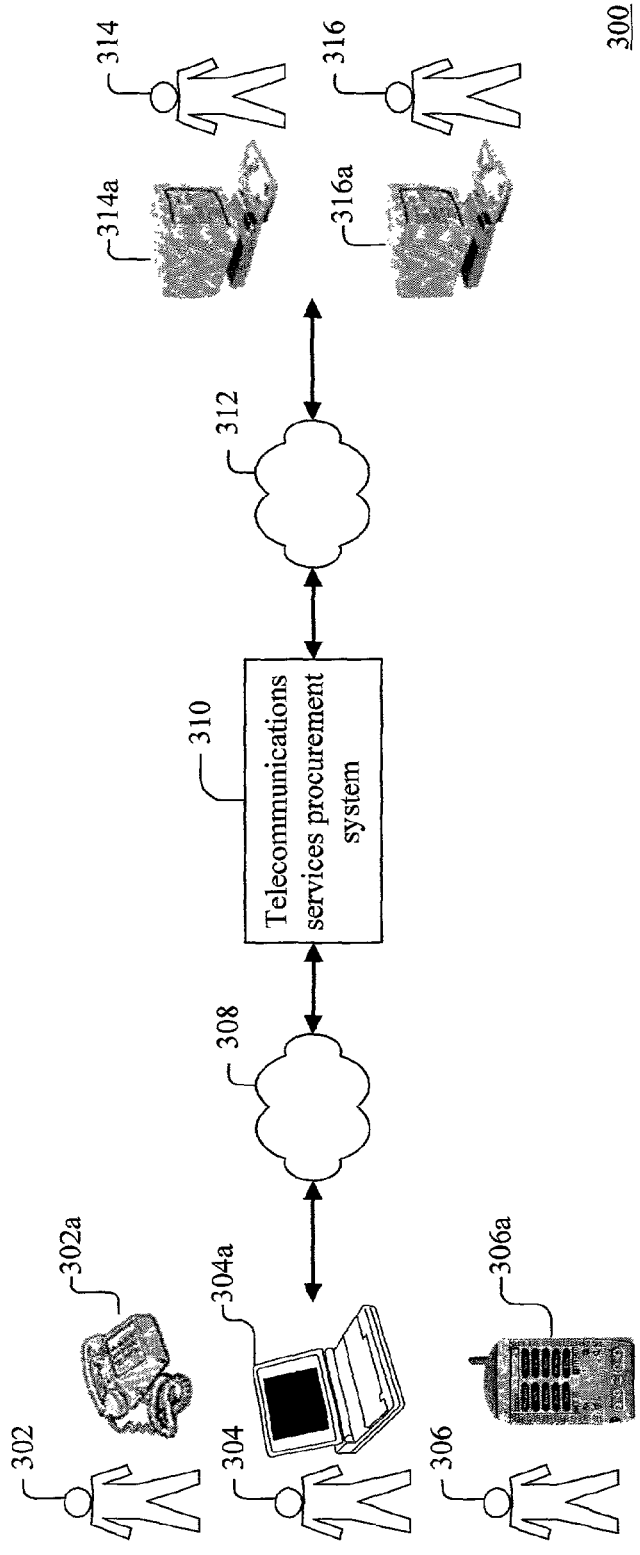
FIG. 3 is a top-level block diagram illustrating a system for procuring telecommunications products and/or services on-line.

Referring to the drawings, wherein like reference numerals designate identical or corresponding parts throughout the several views, and more particularly to FIG. 3 thereof, there is illustrated is a top level block diagram of a system 300 for procuring telecommunications products and/or services on-line, according to the present invention. In FIG. 3, the system 300 may include, for example, one or more customers 302, 304 and 306 and respective customer devices 302a, 304a and 306a (e.g., telephones, personal computers, hand-held devices, etc.) for procuring telecommunications products and/or services on-line. The devices 302a, 304a and 306a may be coupled to a telecommunications service procurement system 310 via a communications network 308 (e.g., a Public Switched Telephone Network (PSTN), the Internet, an Intranet, etc.).

For devices 302a, such as conventional telephony devices, wireless telephony devices, etc., the present invention may be implemented via voice command, speech synthesis, Dual-Tone MultiFrequency (DTMF) input, etc., functions provided in the devices 302a and corresponding voice activated menu, speech recognition, DTMF detection, etc., functions provided by the telecommunications service procurement system 310 over the communications network 308 and based on the processes described in the present invention, as will be appreciated by those skilled in the relevant art(s).

For devices 304a, such personal computers, etc., the present invention may be implemented via the use of web browser, graphical user interface (GUI), etc., functions provided in the devices 304a and corresponding web server, etc., functions provided by the telecommunications service procurement system 310 over the communications network 308 and based on the processes described in the present invention, as will be appreciated by those skilled in the relevant art(s).

For devices 306a, such as personal digital assistants (PDAs), etc., the present invention may be implemented via the use of Wireless Application Protocol (WAP), Microsoft CE, Palm OS, GUI, etc., functions provided in the devices 306a and corresponding web server, etc., functions provided by the telecommunications service procurement system 310 over the communications network 308 and based on the processes described in the present invention, as will be appreciated by those skilled in the relevant art(s).

The system 300 and the telecommunications service procurement system 310 are further described in the commonly owned co-pending U.S. patent application Ser. No. 10/051,282, filed Jan. 22, 2002, entitled "Method And System For Procuring Telecommunications Services On-Line". The system 300 includes software integration, which is further described herein with respect to FIGS. 5-6.

Customer service personnel 314 and/or "swivel-chair" operators 316 may access the telecommunications service procurement system 310, for example, via a back office graphical user interface (GUI, not shown) running on the devices 314a and 316a over, for example, a proprietary communications network 312 (e.g., an Intranet, a virtual private network, etc.) in order to procure telecommunications products and/or services for the customers 302, 304 or 306. The customer service personnel 314 may provide, for example, customer service functions, while the swivel-chair operators 316 may be assigned to, for example, process accepted orders, process modified orders, process supplemental orders, etc.

Similarly, the customers 302, 304 or 306 may order telecommunications products and/or services on-line via a customer GUI (not shown) running on the devices 302a, 304a and 306a over the communications network 308. The back office GUI and the customer GUI are further described in the commonly owned co-pending U.S. patent application Ser. No. 10/051,182, filed Jan. 22, 2002, "Graphical User Interface for Procuring Telecommunications Services On-Line".

In FIG. 3, the devices 302a, 304a and 306a and the respective devices 314a and 316a of the customer service personnel 314 and the swivel-chair operators 316 may communicate with the telecommunications service procurement system 310 using, for example, TCP/IP via the communications networks 308 and 312, respectively. The devices 302a, 304a and 306a and the devices 314a and 316a may include a modem function (e.g., dial-up, DSL, cable, wireless, etc.) that can log in to the telecommunications service procurement system 310 with user validation (e.g., via a personal identification number (PIN), user name and password, etc.).

The telecommunications service procurement system 310 may include all software and hardware to provide, for example, user account maintenance, validation and access control level (ACL) information, a directory server where a customer's personal information is kept, etc. The devices 302a, 304a and 306a, the devices 314a and 316a, the telecommunications service procurement system 310, etc., may be implemented using one or more of the computer system 701 of FIG. 7, for example.

Accordingly, the devices 302a, 304a and 306a, the devices 314a and 316a, the telecommunications service procurement system 310, etc., may include any suitable servers, workstations, personal computers (PCs), personal digital assistants (PDAs), Internet appliances, other devices, etc., capable of performing the processes of the present invention. The devices 302a, 304a and 306a, the devices 314a and 316a, the telecommunications service procurement system 310, etc., may communicate with each other using any suitable protocol via the communications networks 308 and 312.

It is to be understood that the system 300 in FIG. 3 is for exemplary purposes only, as many variations of the specific hardware used to implement the present invention are possible, as will be appreciated by those skilled in the relevant art(s). For example, the functionality of one or more of the devices 302a, 304a and 306a, the devices 314a and 316a, the telecommunications service procurement system 310, etc., may be implemented via one or more programmed computers or devices. To implement such variations as well as other variations, a single computer (e.g., the computer system 701 of FIG. 7) may be programmed to perform the functions performed by, for example, the devices 314a and 316a shown in FIG. 3. On the other hand, two or more programmed computers or devices, for example as in shown FIG. 7, may be substituted for any one of the devices 302a, 304a and 306a, the devices 314a and 316a, the telecommunications service procurement system 310, etc., of FIG. 3. Principles and advantages of distributed processing, such as redundancy, replication, etc., may also be implemented as desired to increase the robustness and performance of the system 300, for example.

The communications networks 308 and 312 may be implemented via one or more communications networks (e.g., the Internet, an Intranet, a wireless communications network, a satellite communications network, a cellular communications network, a Public Switched Telephone Network (PSTN), a hybrid network, etc.), as will be appreciated by those skilled in the relevant art(s). In a preferred embodiment of the present invention, the communications networks 308 and 312 may employ electrical, electromagnetic, optical signals, etc., that carry digital data streams, as are further described with respect to FIG. 7.

Figure 4:
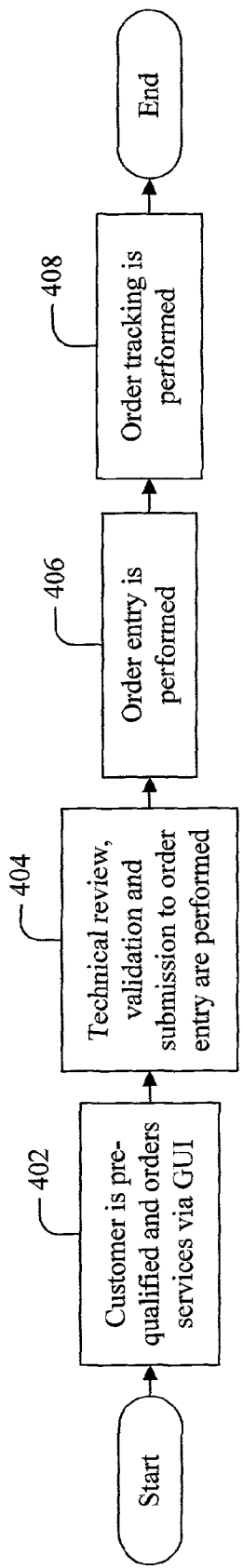
FIG. 4 is a flowchart illustrating a flow for procuring telecommunications products and/or services on-line.

FIG. 4 is a flowchart illustrating a flow for procuring telecommunications products and/or services on-line, according to the present invention. In FIG. 4, at step 402, the customer 302, 304 or 306 is pre-qualified and orders telecommunications products and/or services via the customer GUI. At step 404, technical review, validation and submission to order entry are performed by a service coordinator (e.g., customer service personnel 314, swivel-chair operators 316, etc.). At step 406, order entry for the telecommunications products and/or services desired by the customer 302, 304 or 306 is performed by the service coordinator. At step 408, order tracking is performed by the service coordinator, completing the flow for procuring telecommunications products and/or services, according to the present invention.

Accordingly, the flow for procuring telecommunications products and/or services, according to the present invention, does not involve numerous personnel 108 or time-consuming processing steps 202-210, in order to procure telecommunications products and/or services for a customer, as compared to the flow of FIGS. 1 and 2. Thus, the present invention addresses the noted problems with flow for procuring telecommunications products and/or services.

The method and system for providing software integration for a telecommunications services on-line procurement system may now be described with reference to FIGS. 5-6.

Figure 5:
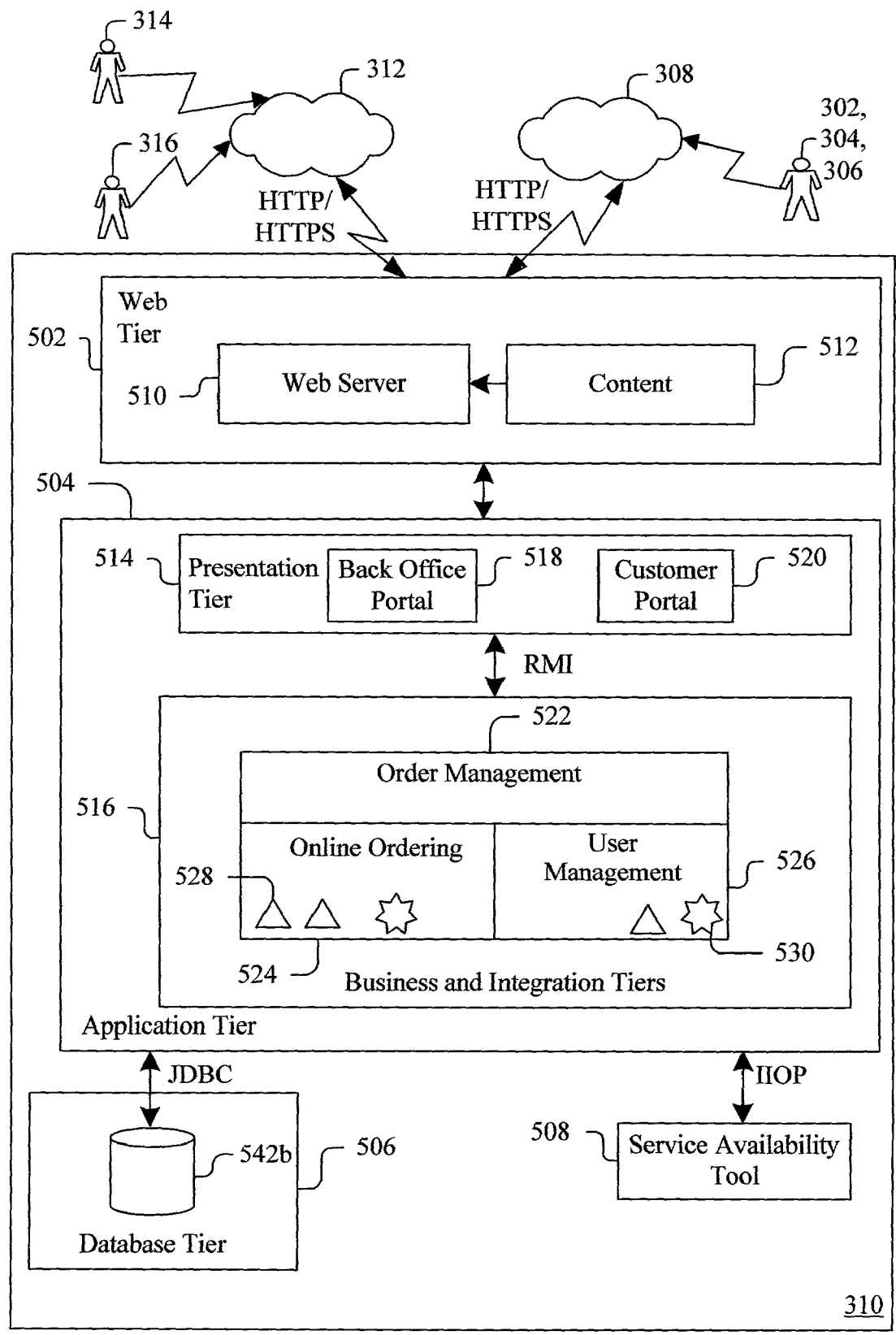
FIG. 5 is a top level block diagram illustrating a logical architecture employed in the system for providing software integration for a telecommunications services on-line procurement system.

FIG. 5 is a top level block diagram illustrating a logical architecture employed in the system 310 for providing software integration for a telecommunications services on-line procurement system, according to the present invention. In FIG. 5, the logical architecture includes a web tier 502, an application tier 504, a database tier 506 and a service availability tool (SAT) 508. The application tier 504 communicates with the database tier 506 using, for example, Java DataBase Connectivity (JDBC). The application tier 504 communicates with the SAT 508 using, for example Internet Inter-ORB Protocol (IIOP).

The web tier 502 is responsible for delivering web content 512 (e.g., HyperText Markup Language (HTML) pages, static content, images, Javascript scripts and cascading style sheets, etc) to the client machines 302a, 304a and 306a and 314a and 316a of FIG. 3. A customer graphical user interface (GUI) is provided for the client machines 302a, 304a and 306a over the communications network 308 as described in the commonly owned co-pending U.S. patent application Ser. No. 10/051,182, filed Jan. 22, 2002, "Graphical User Interface for Procuring Telecommunications Services On-Line".

A back office graphical user interface (GUI) is provided for the client machines 314a and 316a over the communications network 312 as described in the commonly owned co-pending U.S. patent application Ser. No. 10/051,182, filed Jan. 22, 2002, "Graphical User Interface for Procuring Telecommunications Services On-Line". The swivel chair 316 and the customer service 314 personnel can perform swivel chair/back office functions via the back office GUI.

The client machines 302a, 304a and 306a and 314a and 316a running a web browser (e.g., Internet Explorer, Netscape, etc.) and via the respective GUIs connect requested web pages and images from the web site via, for example, HyperText Transport Protocol (HTTP) and HyperText Transport Protocol Secure (HTTPS). Although lower layers generate the system's HTML pages, the web tier 502 manages the building blocks of the HTML pages (e.g., the content 512, etc.). The HTTP and HTTPS requests are passed to a web server 510. The web server 510 serves up requests that it can fulfill and forwards user actions and HTML requests to a presentation tier 514.

The application tier 504 includes the presentation tier 514 framework (e.g., Cygent's presentation tier framework, etc.). Functionality from the presentation tier 514 framework (e.g., Cygent's Small Business Portal, etc.) is leveraged to build a customer portal 520. This is achieved by reusing and/or configuring the existing JavaServer Pages (JSPs) and objects including transition and display policies of the presentation tier framework 514.

A back office portal 518, on the other hand, is custom constructed, but designed with the presentation tier 514 framework (e.g., the Cygent framework, etc.) in mind. In other words, the pages are named in a consistent manner with the rest of the portals, and the same is true for the transition policies and display policies and objects.

The application tier 504 includes a business and integration tier 516 (e.g., Cygent's Business tier and Integration tier, etc.). The business and integration tier 516 is a home for various components, such as activity and domain objects of three functional areas included therein: order management 522, online ordering 524 and user management 526. In FIG. 5, communications messaging interfaces (CMIs) 528 and handlers 530 are also shown. The business and integration tier 516 communicate with the presentation tier 514 using, for example, Remote Method Invocation (RMI).

Domain objects to handle the ordering functionality (e.g., Cygent's ordering functionality domain objects, etc.) were extended and a custom CMI and pricing adapter as an extension to a pricing scheme (e.g., Cygent's pricing scheme, etc.) were designed. Activity objects also referred to as managers or controllers (e.g., Cygent managers or controllers, etc.) are used to coordinate the ordering activities and functions. Business rules (e.g., Cygent, etc.) to constrain the ordering activities as needed are also employed. Existing database 532 tables (e.g., Cygent, etc.) are used to persist online ordering data. Additional tables are designed to extend such schema. Such tables are also mapped to display objects and domain objects (e.g., using a TopLink for Java tool, etc.).

Pre-qualifying a customer 302, 304 or 306 for products and/or services employs an application to make a call out to the SAT 508, which is, for example, Common Object Request Broker Architecture (CORBA) based. A custom CMI and adapter was designed to handle that function.

The system 310 is further described in the commonly owned co-pending U.S. patent application Ser. No. 10/051,282, filed Jan. 22, 2002, entitled "Method And System For Procuring Telecommunications Services On-Line".

Generally, the Cygent framework includes a presentation tier, which is responsible for production of web pages and URL navigation, the business tier, which is responsible for exercising the business rules and transactions and the integration tier, which is responsible for facilitating access to persisted data as well as interfacing with external systems or applications.

The presentation tier includes a web controller, which is a Java Servlet acting as a traffic cop that is responsible for routing requests to the appropriate Java server page (JSP) files or transition policy objects. The transition policies are Java objects, which provide navigation and validation logic. The JSPs are essentially HTML files with embedded Java code for display of dynamic content. A JSP tag library is used to facilitate the use of display objects and display policies that can handle process logic to display a page. The display objects are read-only lightweight objects that shadow domain objects. In that respect, a display object may represent a subset or all of the domain objects attributes. Furthermore, a display object may be mapped to one or more domain objects in order to reduce network traffic and object distribution. Once used, the display objects are discarded.

The business tier is a core of the smart component server. It includes two types of component groups: activity smart components and service smart components. The activity smart components are implemented as stateless session beans using the WebLogic Enterprise JavaBeans (EJB) Server. These components are essentially business rule objects (i.e., controllers), which manipulate and control the domain objects. The service smart components provide services that the activity smart components employ, such as logging, sequencing and data cursoring. The business tier also is responsible for user authentication functions.

This integration tier acts as a gateway to the data store and to external interfaces to external applications. The integration tier provides access to data stores via a data access service, which employs TopLink for Java and is the object relational mapping tool to facilitate the persistence. In addition, the data access service provides serializable Java objects, known as value objects, which can be either display objects or domain objects that are passed by value to one of the tiers above. These core objects address Shop, Offer, Quote, Order, Customer, Sales, Business Rules, Interactions, Profiles, Bill Presentment, Payment, Trouble Ticket and Notice management specifically for telecommunications product transactions. Both the presentation and the business tiers have direct access to the integration tier.

Access to external interfaces is facilitated via communications messaging interfaces (CMIs) of an interconnect service, CMI policies and custom adapters. CMIs provide a mechanism that allows the framework to loosely couple the core functionality with custom components.

The objects that Cygent provides in its Small Business Portal and the Smart Component Server are general-purpose. The Cygent objects employed in the present invention include, for example: (i) Vendor Products objects including, for example, Vendors, Vendor products, Disclosures, Parameter definitions, Parameter enumerations, Parameter groups, Service level agreements (SLAs), Interaction models, CMI policies, etc.; (ii) Offers objects including, for example, Offers, Offer collections, Menus, Display attributes, Determinants, Determinant sequences, Determinants, Determinant items, etc.; and (iii) Pricing Objects including, for example, Price group supported, Price groups, Contexts, Price Arrangements, Prices, Criteria, Unit Prices, etc.

According to the present invention, the Cygent objects are extended and new objects are created, for example, to configure the back office portal 518 and the customer portal 520 of the presentation tier 514, the order management 522, the online ordering 524 and the user management 563*b* of the business and integration tiers 516, etc., to support the specific context (e.g., product lines, etc.) of the present invention.

For example, in the Cygent model, an Offer object simply contains information about the general price of a vendor product. However, for the web site's product collection (e.g., local telephony, switched and dedicated long distance telephony, switched and dedicated toll free telephony, calling cards, cellular/Personal Communications Services (PCS), paging, dial-up Internet, conferencing, integrated messaging, Digital Subscriber Line (DSL), dedicated Internet, private line, frame relay, etc., etc.) the Offer object is extended (e.g., the extended object is identified by appending "Onol" thereto) to carry additional information for such product collection. Exemplary extensions to the Cygent Offer object are described below.

An OnolOffer object may include, for example, a new attribute that tells the web site whether additional pricing for an offer, beyond the standard Cygent display, may be shown. This enables the system to, for example, display a button that, when pressed, takes the customer 302, 304 or 306 to a page displaying such pricing information.

In addition, the OnolOffer object may include a new attribute that, for example, holds the number of T-1 trunks, circuits, etc., the underlying Cygent VendorProduct object employs. This enables the web site, for example, to keep track of how many T-1 trunks have been configured and to display this and corollary facts (e.g., how many trunks still require to be configured, the percentage of trunks already configured, etc.) to a user (e.g., the customer service 314 personnel, the swivel chair operator 316 personnel, etc.).

Further, the OnolOffer object may include, for example, a new attribute that holds the Estimated Monthly Usage (EMU) for the Cygent Offer object. From this figure, the web site, for example, can calculate the total EMU for an order by adding the EMU figures for each Offer object in an order.

The process of extension in the Java Object realm (e.g., the application tier 504, etc.) is paralleled by extensions in the database realm (e.g., in the database tier 506, etc.). Accordingly, a new "Onol" table, linked to a Cygent Offer table by primary key, OID (Object Identifier), etc., is created, according to the present invention. This table contains, for example, the information for the new attributes of the extended Cygent Object, the OnolOffer object.

The Cygent model also may be extended, for example, to configure new Objects. In principle, this sort of extension is similar to the type described above. Examples of new objects that may be created include, for example, objects created to hold additional information displayed about OnolOffer objects. These include, for example, an OutboundInternationalRate object, which may include attributes corresponding to the web site country codes, switched rates, dedicated rates for the various countries indicated in the web site's Product and Pricing Matrix, etc.

As described above, the present invention includes customizations made to the Cygent framework, including, for example, the Smart Component Server and Small Business Portal. These customizations are intended to leverage Cygent's generic architecture to solve the specific business processes of the web site of the present invention. With respect to order management, this includes, for example, functionality involving orders in a post-submitted state. For example, this involves views of an order by customers 302, 304 or 306 and operators 314 and 316 alike, as well as move, change or disconnection (MCD) of orders and supplemental orders (Supps). The order management also includes other back office functionality, such as context-sensitive contact information, "web callback" forms, Help Center information, requests for inventory, etc.

The following description applies to custom software developed according to the present invention, for example, including Java Server Pages (JSPs), Java objects (e.g., such as transition policies, display policies, etc.), session bean control objects, domain objects, etc. Order management, MCD/Supp, order tracking, and order submission functionality is supported using, for example, a common set of domain classes. These classes, where possible, leverage Cygent's class framework. This results in a smaller set of custom classes to be implemented and also enhances the robustness and maintainability of the web site. The following FIGS. 5*b*-5*g* describe exemplary custom classes, according to the present invention. A Rose model is used to display the classes in their UML format. The Cygent classes are noted as such.

Figure 6A:
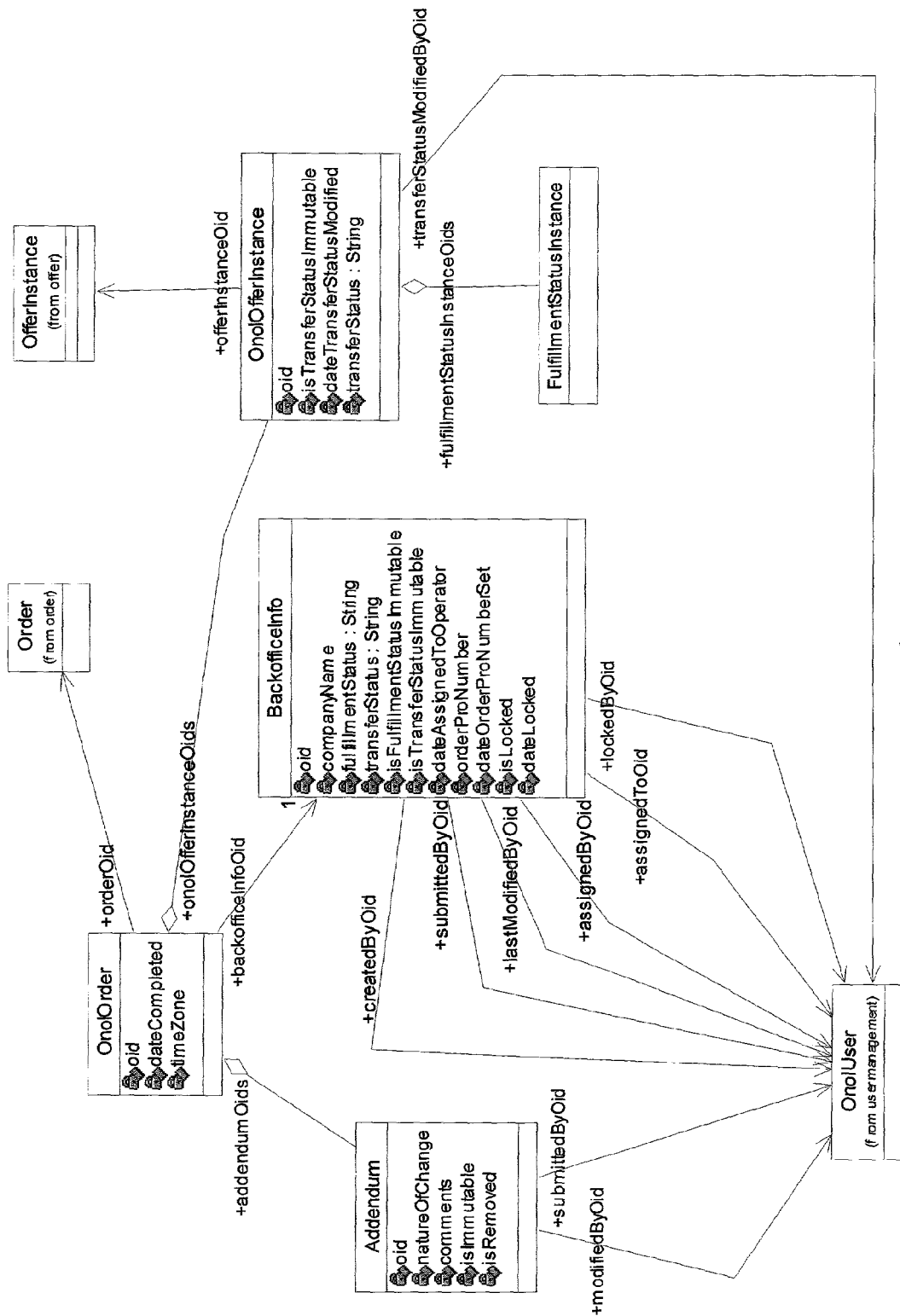
FIG. 6a is a Rose model used for illustrating the Order Domain for providing software integration for a telecommunications services on-line procurement system.

FIG. 6*a* is a Rose model used for illustrating the Order Domain, according to the present invention. In FIG. 6*a*, the Order Domain Model represents those classes that extend the Cygent Order classes and support functionality employed by the web site that is not provided by the Cygent Order classes. For example, the OnolOrder class exists in order to hold that information that back office processes employ (e.g., who has been assigned an order, who made the assignment, when was it assigned, etc.).

A description of each class shown in FIG. 6*a*, for example, is as follows:

Order: This is a Cygent class that represents an order.

OfferInstance: This is a Cygent class that represents a product within an order.

OnolOrder: This is a custom class that wraps Cygent's Order class to represent an order placed by the customer 304, 340 or 306, adding information necessary for tracking in the web site environment. This class holds a single instance of BackofficeInfo and a list of OnolOfferInstances as well as a reference to Cygents Order class.

OnolOfferInstance: This class wraps Cygent's OfferInstance class to represent a product within an order, adding information necessary for tracking at the product level. An instance of this class is instantiated to represent a single product within an order and, as such, is tied to an order. It holds instances of TransferStatus and a list of FulfillmentStatusInstances (see below for description of FulFillmentStatusInstances) as well as a reference to Cygent's OfferInstance class.

OnolUser: This is a custom class that represents a baseline user (e.g., the customers 302, 304 and 306, the customer service 314 and swivel chair operator 316 personnel, etc.).

BackofficeInfo: This is a custom class that holds those attributes that are common to orders, MCDs, and Supps. These attributes assist back office operators (e.g., the customer service 314 and swivel chair operator 316 personnel, etc.) in the transfer of data to operational support system (OSS) order entry (e.g., OrderPro, etc.) and (IXPlus, etc.) e-billing applications, tracking of statuses on services being provisioned, provide storage for information being communicated back to the customer, etc. Examples include locking/unlocking, statusing, OSS order entry application (e.g., OrderPro, etc.) Number, modification, and assignment.

Addendum: This is a custom class that is used to hold those attributes pertaining to a single addendum that is tied to an order. When a back office operator creates an addendum on an order, an instance of this class is created to hold the information entered by the operator. This instance is then tied to the instance of the order.

FulfillmentStatusInstance: Please see the Fulfillment Status Domain Model of FIG. 6b for a description of this class and associated classes.

Use cases that relate to the order domain include, for example: Browse Orders as Back Office Operator, Search Accepted Orders as System, Search MCDs and SUPPs as System, Assign Swivel Chair Operator as Back Office Operator, Sort Results List as Back Office Operator, Browse Order Summary as Back Office Operator, Browse Order Detail as Back Office Operator, Browse Product Detail as Back Office Operator, Lock Accepted Order as System, Unlock Accepted Order, Add Accepted Order Addendum as Back Office Operator, View Accepted Order Addendum as Back Office Operator, Edit Accepted Order Addendum as Back Office Operator, Remove Accepted Order Addendum as Back Office Operator, Update Accepted Order Addendum as Back Office Operator, Update Accepted Order as Back Office Operator, Cancel Accepted Order as Back Office Operator, Update Product Transfer Status, Update Fulfillment Status as Back Office Operator, Send Fulfillment Status Notification as Back Office Operator, Update an OSS e-billing Application (e.g., IXPlus, etc.) Numbers as System, Send Cancelled Order Notification as System, Place Accepted Order on Hold as Back Office Operator, etc.

Figure 6B:
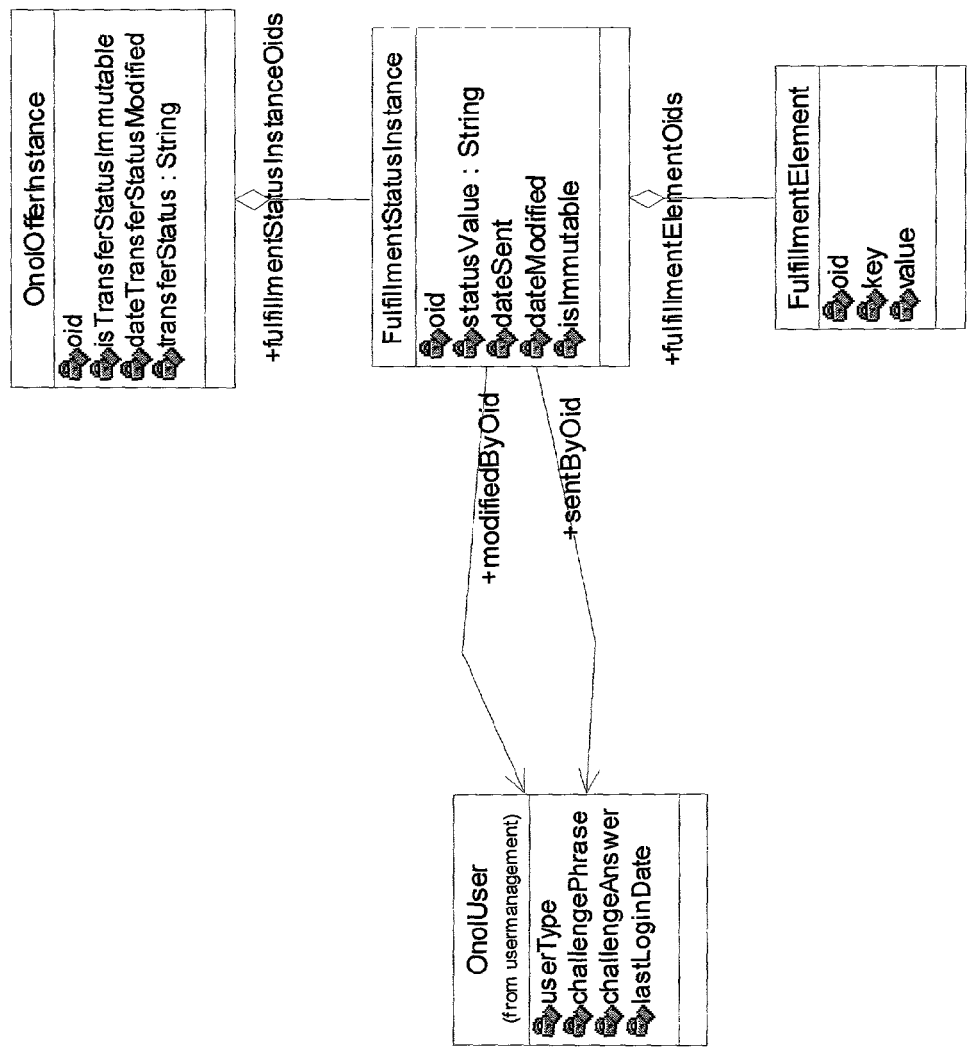
FIG. 6b is a Rose model used for illustrating the Fulfillment Status Domain for providing software integration for a telecommunications services on-line procurement system.

FIG. 6b is a Rose model used for illustrating the Fulfillment Status Domain, according to the present invention. In FIG. 6b, the Fulfillment Status Domain Model represents those classes that support the web site fulfillment status functionality. Cygent's framework does not support the concept of fulfillment status as it is done in the web site; therefore, these classes were employed. The web site fulfillment status functionality involves the back office operator filling out a series of forms for each product within an order. Once these forms are filled out, the operator can choose to generate a fulfillment letter that is then emailed to various parties. The form data is employed to be persisted. The Fulfillment Status Domain model represents the fields of the forms and the forms relationships to the products.

A description of each class shown in FIG. 6b, for example, is as follows:

OnolUser: This class was previously described with respect to FIG. 6a.

OnolOfferInstance: This class was previously described with respect to FIG. 6a.

FulfillmentStatusInstance: This is a custom class that is used to hold information about a fulfillment status form as a whole. This information includes who modified the fulfillment status, as well as the elements and type of fulfillment status. For example, if a back office operator saves or generates a letter for the Welcome Confirmation fulfillment status, an instance of FulfillmentStatusInstance would be updated. This instance would then hold a list of FulfillmentElement instances which would represent each field on the form and its value. FulfillmentStatusInstance would hold onto an instance of FulfillmentStatus so that the type of fulfillment status this instance represented could be gleaned. Finally, the operator who modified the form and/or sent the letter would be recorded.

FulfillmentElement: This is a custom class that is used to hold key-value pairs that map directly to fulfillment status form fields and the values of those form fields. For example, on the WelcomeConfirmation fulfillment form, there is a field on the form for DMARC. When a back office operator saves the form or generates a letter based on the form, and instance of FulfillmentElement will be created and its attribute named key would be set to the string 'DMARC' and is attribute named value would be set to whatever value the operator placed in the form. An instance of FulfillmentElement will be created for each form field.

Use cases that relate to the fulfillment domain include, for example: Update Fulfillment Status as Back Office Operator, Send Fulfillment Status Notification as Back Office Operator, etc.

Figure 6C:
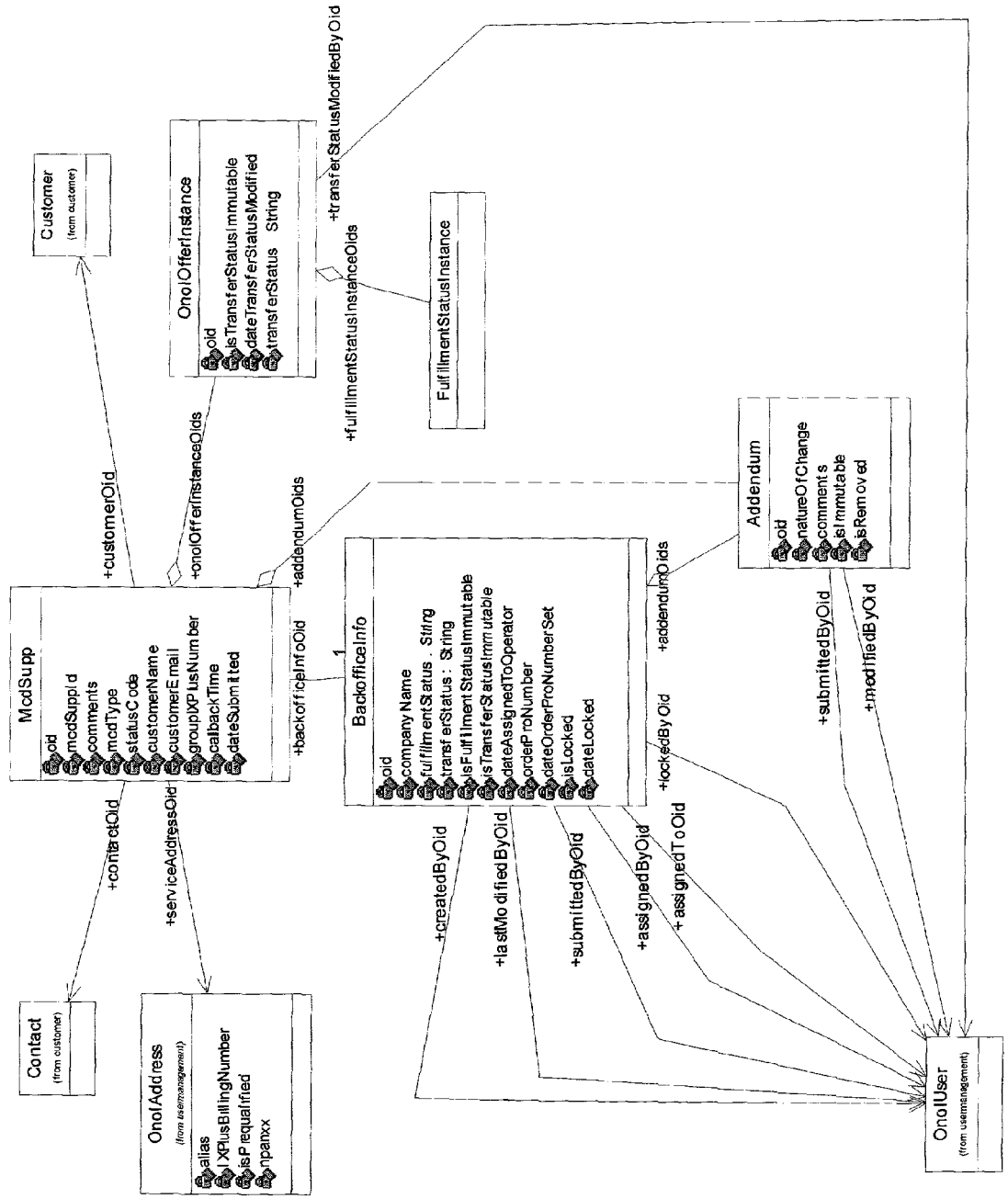
FIG. 6c is a Rose model used for illustrating the move, change or disconnection (MCD) Domain for providing software integration for a telecommunications services on-line procurement system.

FIG. 6c is a Rose model used for illustrating the MCD/Supp Domain, according to the present invention. In FIG. 6b, the MCD/Supp Domain Model represents those classes that provide limited tracking for changes to orders and provisioned services. The MCD/Supp Domain stores a summary of information recorded in detail in OSS order entry application (e.g., OrderPro, etc.) and OSS status applications (e.g., StatusPro, etc.).

A description of each class shown in FIG. 6c, for example, is as follows:

Address: This is a Cygent class which represents an address. MCD/SUPPs use this to reference a specific service address.

Contact: This is a Cygent class that holds contact information for a person.

Customer: This is a Cygent class which represents a customer.

OnolUser: Please see the Order Domain Model of FIG. 6a for a description of this class.

McdSupp: This is a custom class that is used to hold those attributes that pertain to the MCD or Supp request. When a customer or back office operator enters a MCD or Supp, an instance of this class will be created to hold the information entered by the customer or operator. For example, it will hold an instance of Address that will pertain to the selected service address, values for customer and contact-related attributes, references to products via OnolOfferInstances, and any other information pertaining to the MCD or Supp request.

BackofficeInfo: Please see the Order Domain Model of FIG. 6a for a description of this class.

Addendum: Please see the Order Domain Model of FIG. 6a for a description of this class.

FulfillmentStatusInstance: Please see the Fulfillment Status Domain Model of FIG. 6b for a description of this class.

OnolOfferInstance: Please see the Order Domain Model of FIG. 6a for a description of this class.

Use cases that relate to the MCD/Supp domain include, for example: Create MCD as Customer, Create MCD or SUPP as Back Office Operator, View MCD or SUPP as Back Office Operator, Update MCD or SUPP Status as a Back Office Operator, Edit MCD as Back Office Operator, Cancel MCD or SUPP, Browse Orders as Back Office Operator, Search MCDs and SUPPs as System, Assign Swivel Chair Operator as Back Office Operator, Sort Results List as Back Office Operator, etc.

Figure 6D:
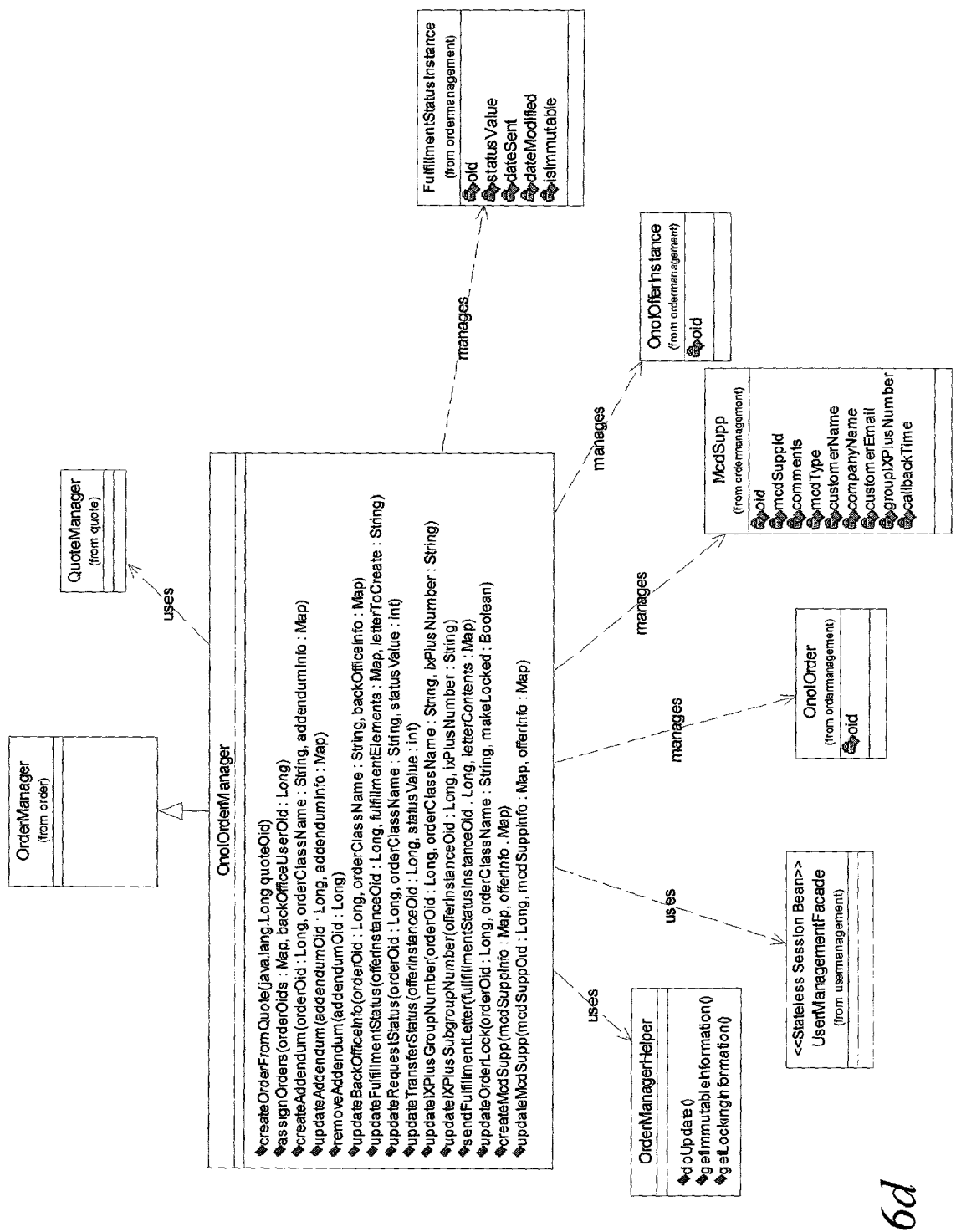
FIG. 6d is a Rose model used for illustrating the Order Activity Domain for providing software integration for a telecommunications services on-line procurement system.

FIG. 6d is a Rose model used for illustrating the Order Activity Domain, according to the present invention. In FIG. 6d, the Order Activity Model represents the part of the architecture that carries out business/application logic for order management-related events, particularly when they involve persistence, transaction-sensitive data retrieval, or specialized business logic. They persist data by instantiating the classes described in the Domain Model sections and then setting the attributes of those objects using any specialized business logic which may be employed. Once the attributes are set, the object is then saved to the database.

A description of each class shown in FIG. 6d, for example, is as follows:

OrderManager: This is a Cygent Smart Component which handles business logic related to orders.

OnolOrderManager: This class is used by the Back office Transition Policies to persist data and to perform specialized business logic. It inherits all methods and relationships from its parent Cygent class, OrderManager. Whenever a Transition Policy needs to persist data or perform a specialized business function, it will instantiate an instance of this class and then invoke one of its methods (passing in the parameters employed) to do the work. Because it is a stateless session bean, transaction management is handled automatically by the container, allowing rollback should a transaction fail. Whenever possible, the OnolOrderManager will instantiate a helper object and then invoke one of its methods to do the actual work. In essence the OnolOrderManager will act as a director; directing requests to appropriate helpers.

UserManagementFacade: A custom interface into the User Management domain.

QuoteManager: This is a Cygent Smart Component which handles business logic related to quotes and converting quotes to orders.

Helper: This is a custom abstract class that is subclassed by specialized "helpers". Please see the Helpers Domain Model of FIG. 6e for a description of this class. A helper is used by the OnolOrderManager to handle creation of objects, execution of business logic and the persistence of objects.

Figure 6E:
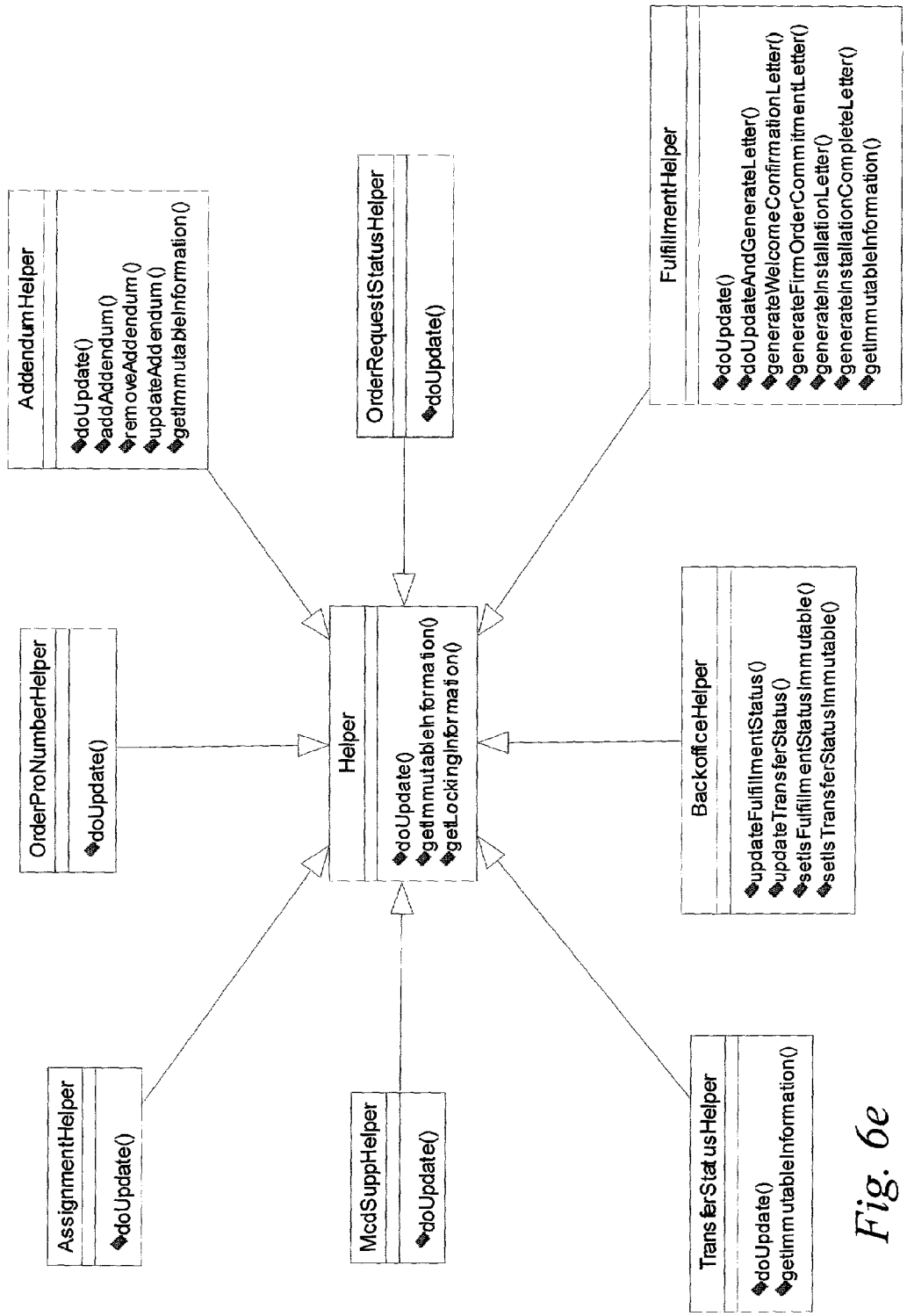
FIG. 6e is a Rose model used for illustrating the Helpers Domain for providing software integration for a telecommunications services on-line procurement system.

FIG. 6e is a Rose model used for illustrating the Helpers Domain, according to the present invention. In FIG. 6e, the Helpers Model represents those classes that manage domain objects. The Helpers domain is responsible for the creation of domain objects, the performance of any specialized business logic and the persistence of the domain objects. These classes are used by the OnolOrderManager to perform its methods.

A description of each class shown in FIG. 6e, for example, is as follows:

Helper: A custom abstract superclass that contains default implementation of methods, for example, which may not be overridden by its subclasses.

AssignmentHelper: This custom class manages the creation, update, and persisting of an Assignment domain object. It is responsible for enforcing any business rules that are involved in handling an OSS order entry application (e.g., OrderPro, etc.) number assignment.

McdSuppHelper: This custom class manages the creation, update, and persisting of the McdSupp objects. It is responsible for enforcing any business rules which apply to MCDs and Supps.

TransferStatusHelper: This custom class manages the creation, update, and persisting of the transfer status and enforcing any business rules that apply to setting the product or order transfer status. It is also responsible for deriving the order transfer status based on the fulfillment status of each product within an order.

BackofficeInfoHelper: This custom class manages the creation, update, and persistence of the BackofficeInfo domain objects that are associated with an order or Mcd/Supp.

OrderProNumberHelper: This custom class manages the creation, update, and persisting of an OSS order entry application (e.g., OrderPro, etc.) number and its association with an order. It is responsible for enforcing any business rules that are involved in handling an OSS order entry application (e.g., OrderPro, etc.) number assignment.

AddendumHelp: This custom class manages the creation, update, and persisting of an addendums. It is responsible for making sure the addendum is created and attached to the appropriate order as well as enforcing any business rules that are involved in handling addendums.

FulfillmentStatusHelper: This custom class manages the creation, update, and persisting of the fulfillment status forms as well as the generation of the fulfillment status letters that will be sent to various parties via e-mail. It is also responsible for deriving the order fulfillment status based on the fulfillment status of each product within an order.

OrderRequestStatusHelper: This custom class manages the updating of the order request status.

The web site's functional employments for Pre- and Post-Sales support outline the retrieval of back office contact information based on context. This context is based on, for example: Web site location, status (of an order, MCD, SUPP, or product), the type of product (or more correctly, "Offer"), etc. Typically, Cygent does not support this kind of context-based retrieval. Accordingly, the following custom classes are created to extend the Cygent framework.

Figure 6F:
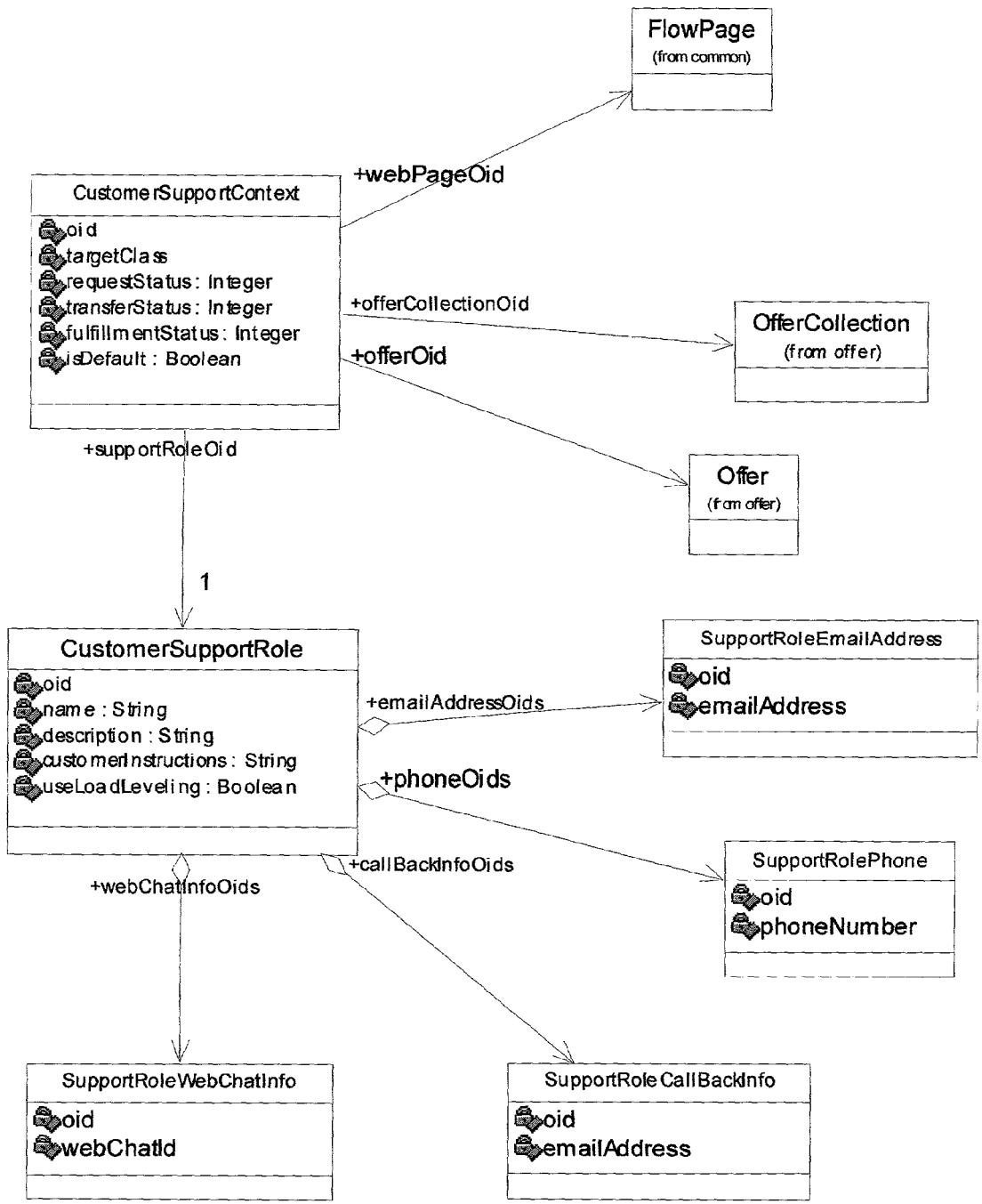
FIG. 6f is a Rose model used for illustrating the Customer Support Context Domain for providing software integration for a telecommunications services on-line procurement system.

FIG. 6f is a Rose model used for illustrating the Customer Support Context Domain, according to the present invention. In FIG. 6f, the Customer Support Context Domain Model represents those custom classes that provide storage (e.g., static, dynamic, etc.) for information needed to retrieve an appropriate set of contact information for Back Office personnel. For example, the CustomerSupportContext class exists to hold information used to match values from the presentation tier 514 in order to retrieve a specific CustomerSupportRole and its aggregate data.

A description of each class shown in FIG. 6f, for example, is as follows:

CustomerSupportContext: A custom class that maps the context of web page, status, and offer information with a given customer support role.

CustomerSupportRole: A custom class that represents a person or group of the web site responsible for answering customer inquiries. This object aggregates phone numbers, email addresses, and web chat session parameters for the single role.

SupportRoleEmailAddress: One or more instances of this custom class form a list of email addresses for a single customer support role.

SupportRolePhone: One or more instances of this class custom form a list of phone numbers for a single customer support role.

SupportRoleCallBackInfo: One or more instances of this custom class form a list of email addresses (specific for web callback responsibilities) for a single customer support role.

SupportRolewebChatInfo: One or more instances of this custom class form a list of web chat connection parameters for a single customer support role.

FlowPage: This is a Cygent class that represents a registered web page.

Offer: This is a Cygent class that represents a product (from the "web site" perspective).

OfferCollection: This is a Cygent class that represents a series of products (from the "web site" perspective) tied together and offered as a single product.

Use cases that relate to the Customer Support Context domain include, for example: Browse Help By Customer, Retrieve Context-Based Support Info By System, Request Callback as Customer, Submit Customer Support Email as Customer, Chat With Customer Support as Customer, Request Inventory, etc.

The present invention may store information relating to various processes described herein. Such information may be stored in one or more memories, such as a hard disk, optical disk, magneto-optical disk, RAM, etc. One or more databases, such as the databases included in the systems and methods of FIGS. 3-6, may store the information used to implement the present invention. The databases may be organized using data structures (e.g., records, tables, arrays, fields, graphs, trees, and/or lists) included in one or more memories, such as the memories listed above or any of the storage devices listed below in the discussion of FIG. 7, for example.

The previously described processes may include appropriate data structures for storing data collected and/or generated by the systems and processes of FIGS. 3-6 in one or more databases thereof. Such data structures accordingly may include fields for storing such collected and/or generated data. In a database management system implementation, data may be stored in one or more data containers, each container including records and the data within each record may be organized into one or more fields. In a relational database systems implementation, the data containers may be referred to as tables, the records may be referred to as rows and the fields may be referred to as columns. In an object-oriented database implementation, the data containers may be referred to as object classes, the records may be referred to as objects and the fields may be referred to as attributes. Other database architectures may be employed and may use other terminology. Systems that implement the present invention may not be limited to any particular type of data container or database architecture.

All or a portion of the invention (e.g., as described with respect to FIGS. 3-6) may be conveniently implemented using one or more conventional general purpose computers, microprocessors, digital signal processors, micro-controllers, etc., programmed according to the teachings of the present invention (e.g., using the computer system of FIG. 7), as will be appreciated by those skilled in the computer art. Appropriate software may be readily prepared by programmers of ordinary skill based on the teachings of the present disclosure, as will be appreciated by those skilled in the software art. In addition, the present invention (e.g., as described with respect to FIGS. 3-6) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 7).

Figure 7:
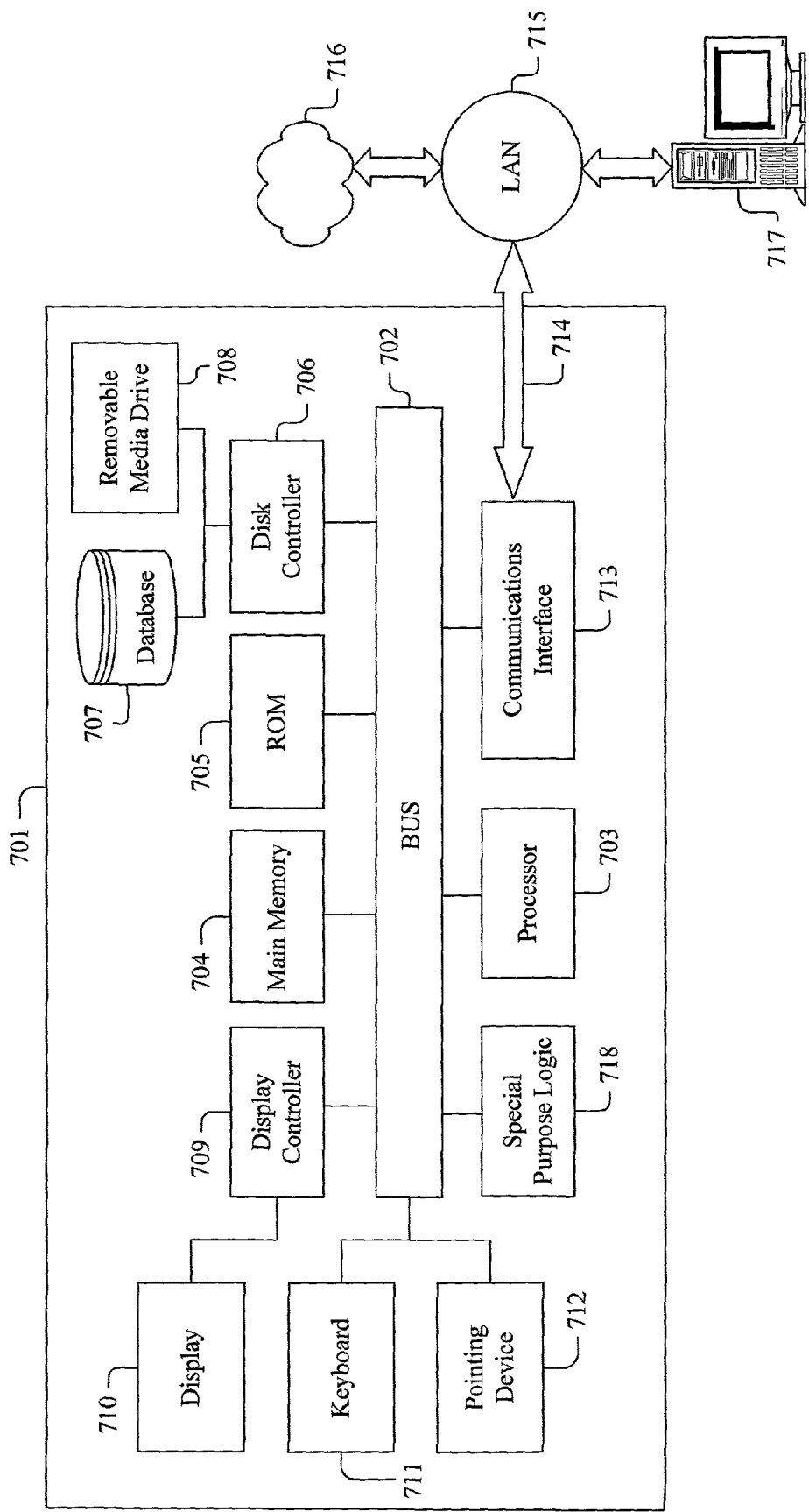
FIG. 7 is an exemplary computer system, which may be programmed to perform one or more of the processes of the present invention.

FIG. 7 illustrates a computer system 701 upon which the present invention (e.g., systems and methods of FIGS. 3-6, etc.) may be implemented. The present invention may be implemented on a single such computer system or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 can also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the systems and methods shown in FIGS. 3-6, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments of the present invention are not limited to any specific combination of hardware circuitry and/or software.

Stored on any one or on a combination of computer readable media, the present invention includes software for controlling the computer system 701, for driving a device or devices for implementing the invention, and for enabling the computer system 701 to interact with a human user (e.g., a user of the systems and methods of FIGS. 3-6, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716, such as the Internet. For example, the communication interface 713 may be a digital subscriber line (DSL) card or modem, an integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 713 sends and receives electrical, electromagnetic and/or optical signals that carry digital data streams representing various types of information. Further, the communication interface 713 can include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the "Internet") or to data equipment operated by service provider. The local network 715 and network 716 both use electrical, electromagnetic and/or optical signals to convey information and instructions. The signals through the various networks and the signals on network link 714 and through communication interface 713, which communicate digital data with computer system 701, are exemplary forms of carrier waves bearing the information and instructions.

The computer system 701 can send messages and receive data, including program code, through the network(s), network link 714 and communication interface 713. In an Internet example, a server (not shown) might transmit requested code belonging to an application program for implementing an embodiment of the present invention through the network 716, LAN 715 and communication interface 713. The processor 703 may execute the transmitted code while being received and/or store the code in storage devices 707 or 708 or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term "computer readable medium" as used herein refers to any medium that participates in providing instructions to the processor 703 for execution. Such a medium may take many forms, including but not limited to, non-volatile media, volatile media, transmission media, etc. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire, fiber optics, including the wires that make up the bus 702. Transmission media can also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but rather covers various modifications and equivalent arrangements, which fall within the purview of the appended claims.

What is claimed is:

1. A system for providing software integration for on-line procurement of telecommunications services, comprising:
   a web tier configured to receive a request or a user action from a web server, and to access web content; and
   an application tier coupled to the web tier and including a business and integration tier configured to perform order management, online ordering and user management functions, and a presentation tier including a customer portal configured to provide to the web server customer order information, customer support information, and customer order status information, and a back office portal configured to provide requests for inventory of the telecommunications services to the web server,
   a database tier, comprising a database, in communication with the application tier, and
   a service availability tool (SAT) tier, in communication with the application tier, configured to pre-qualify a customer for the telecommunication services, wherein the web tier or the application tier includes software objects extended from general-purpose software objects to support procurement of the telecommunications services on-line and custom software objects created to support procuring of the telecommunications services on-line.

2. The system of claim 1, wherein the web tier includes reconfigured software objects that include reconfigured JavaServer Pages (JSPs), reconfigured transition policies, or reconfigured display objects.

3. The system of claim 1, wherein the web tier includes the custom software objects that include custom JavaServer Pages (JSPs), custom transition policies, or custom display objects.

4. The system of claim 1, wherein the application tier includes reconfigured software objects that include reconfigured JavaServer Pages (JSPs), reconfigured transition policies, or reconfigured display objects.

5. The system of claim 1, wherein the application tier includes the custom software objects that include custom JavaServer Pages (JSPs), custom transition policies, or custom display objects.

6. The system of claim 1, wherein the application tier includes an order management function for providing to the web tier the callback forms, help center information, or requests for inventory.

7. The system of claim 1, wherein the application tier includes an online ordering function for providing online ordering functionality to the web tier.

8. The system of claim 1, wherein the application tier includes a user management function for providing user management functionality to the web tier.

9. The system of claim 1, further comprising a database tier coupled to the web tier or the application tier and configured to persist data, store objects or store tables.

10. The system of claim 9, wherein the web tier or the application tier is configured to generate custom tables to extend a schema of tables.

11. The system of claim 10, wherein the web tier or the application tier is configured to map the custom tables to the extended software objects or the custom software objects.

12. The system of claim 1, wherein the extended software objects or the custom software objects belong to an order domain configured to support an order class.

13. The system of claim 1, wherein the extended software objects or the custom software objects belong to a fulfillment status domain configured to provide order fulfillment functionality.

14. The system of claim 1, wherein the extended software objects or the custom software objects belong to a move, change or disconnect (MCD) domain configured to store summary information of operational support system (OSS) order entry and status applications.

15. The system of claim 1, wherein the extended software objects or the custom software objects belong to an order activity domain configured to carry out business logic or application logic for order management events involving persistence, transaction-sensitive data retrieval or specialized business logic.

16. The system of claim 1, wherein the extended software objects or the custom software objects belong to a helpers domain configured to create domain objects, perform specialized business logic or perform persistence of domain objects.

17. The system of claim 1, wherein the extended software objects or the custom software objects belong to a customer support domain configured to provide storage for information needed to retrieve an appropriate set of contact information for back office personnel.

18. A method for providing software integration for on-line procurement of telecommunications services, comprising:
receiving a request or a user action from a web server in a web tier and accessing web content responsive to the request or user action;
performing order management, online ordering and user management functions, and establishing a customer portal, producing web pages, and navigating uniform resource locators (URLs) in an application tier, and a back office portal configured to provide requests for inventory of the telecommunications services to the web server;
communicating, with a database, by the application tier, and
communicating with the application tier to pre-qualify a customer for the telecommunication services,
extending software objects from general-purpose software objects in the web tier or the application tier to support procuring of the telecommunications services on-line; and
creating custom software objects in the web tier or the application tier to support the procurement of the telecommunications services on-line,
wherein the customer portal includes the extended software objects and is configured to provide to the web server customer order information, customer support information, and customer order status information.

19. The method of claim 18, further comprising reconfiguring software objects that are included in the web tier and that include reconfigured JavaServer Pages (JSPs), reconfigured transition policies, or reconfigured display objects.

20. The method of claim 18, further comprising creating custom objects that are included in the web tier and that include custom JavaServer Pages (JSPs), custom transition policies, or custom display objects.

21. The method of claim 18, further comprising reconfiguring software objects that are included in the application tier and that include reconfigured JavaServer Pages (JSPs), reconfigured transition policies, or reconfigured display objects.

22. The method of claim 18, further comprising creating custom objects that are included in the application tier and that include custom JavaServer Pages (JSPs), custom transition policies, or custom display objects.

23. The method of claim 18, further comprising including in the application tier an order management function for providing to the web tier the callback forms, help center information, or requests for inventory.

24. The method of claim 18, further comprising including in the application tier an online ordering function for providing online ordering functionality to the web tier.

25. The method of claim 18, further comprising including in the application tier a user management function for providing user management functionality to the web tier.

26. The method of claim 18, further comprising persisting data, storing objects or storing tables in a database tier coupled to the web tier or the application tier.

27. The method of claim 26, further comprising generating custom tables to extend a schema of tables in the web tier or the application tier.

28. The method of claim 27, further comprising mapping the custom tables to the extended software objects or the custom software objects in the web tier or the application tier.

29. The method of claim 18, further comprising configuring the extended software objects or the custom software objects in an order domain to support an order class.

30. The method of claim 18, further comprising configuring the extended software objects or the custom software objects in a fulfillment status domain to provide order fulfillment functionality.

31. The method of claim 18, further comprising configuring the extended software objects or the custom software objects in a move, change or disconnect (MCD) domain to store summary information of operational support system (OSS) order entry and status applications.

32. The method of claim 18, further comprising configuring the extended software objects or the custom software objects in an order activity domain to carry out business logic or application logic for order management events involving persistence, transaction-sensitive data retrieval or specialized business logic.

33. The method of claim 18, further comprising configuring the extended software objects or the custom software objects in a helpers domain to create domain objects, perform specialized business logic or perform persistence of domain objects.

34. The method of claim 18, further comprising configuring the extended software objects or the custom software objects in a customer support domain to provide storage for information needed to retrieve an appropriate set of contact information for back office personnel.

35. A non-transitory computer-readable medium storing computer-executable instructions for performing the steps recited in claim 18.

36. A system for providing software integration for on-line procurement of telecommunications services, comprising:
  means for receiving a request or a user action from a web server in a web tier and receiving web content responsive to the request or user action;
  means for performing order management, online ordering and user management functions in an application tier and establishing a customer portal, producing web pages and navigating uniform resource locators (URLs), and a back office portal configured to provide requests for inventory of the telecommunications services to the web server;
  a database for communicating with the application tier;
  means to pre-qualify a customer for the telecommunication services;
  means for extending software objects from general-purpose software objects in the web tier or the application tier to support procuring of the telecommunications services on-line; and
  means for creating custom software objects in the web tier or the application tier to support the procurement of the telecommunications services on-line,
  wherein the customer portal includes the extended software objects and is configured to provide to the web server customer order information, customer support information, and customer order status information.

37. The system of claim 1, wherein the web tier includes reconfigured software objects that include reconfigured JavaServer Pages (JSPs), reconfigured transition policies, or reconfigured display objects; wherein the application tier includes reconfigured software objects that include reconfigured JavaServer Pages (JSPs), reconfigured transition policies, or reconfigured display objects, wherein the database tier is coupled to the web tier or the application tier and configured to persist data, store objects or store tables, and wherein the extended software objects or the custom software objects belong to an order domain configured to support an order class or belong to a fulfillment status domain model configured to provide order fulfillment functionality involving a back office operator filling out a series of forms with data for each telecommunications service within an order and the backroom operator selectively generating a fulfillment letter that is then transmitted to other parties, the form data being persisted, and wherein the fulfillment status domain model represents fields of the forms and relationships of the forms to the telecommunications services and the fulfillment status domain model represents classes that include a custom class that represents a baseline user, a class that represents a telecommunications service within an order, adding information necessary for tracking at a telecommunications service level, a custom class used to hold information about a fulfillment status form as a whole, and a custom class that is used to hold key-value pairs that map directly to fulfillment status form fields and the values of those form fields.

* * * * *